(12) United States Patent
Marwali et al.

(10) Patent No.: US 12,059,972 B1
(45) Date of Patent: Aug. 13, 2024

(54) SPLIT LEG FILTERING FOR BIDIRECTIONAL POWER STAGES

(71) Applicant: Rivian IP Holdings, LLC, Plymouth, MI (US)

(72) Inventors: Mohammad Nanda Rahmana Marwali, Irvine, CA (US); Yuxiang Shi, Cary, NC (US); Muhammad Mobeen Mahmood, Irving, TX (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 18/185,294

(22) Filed: Mar. 16, 2023

(51) Int. Cl.
*B60L 55/00* (2019.01)
*B60L 53/60* (2019.01)

(52) U.S. Cl.
CPC .............. *B60L 55/00* (2019.02); *B60L 53/60* (2019.02); *B60L 2210/30* (2013.01); *B60L 2210/40* (2013.01)

(58) Field of Classification Search
CPC ...... B60L 55/00; B60L 53/60; B60L 2210/30; B60L 2210/40
See application file for complete search history.

(56) References Cited

U.S. PATENT DOCUMENTS

| | | | |
|---|---|---|---|
| 9,293,978 B2 * | 3/2016 | Ayana | H02M 5/458 |
| 11,557,957 B1 | 1/2023 | Abolhassani | |
| 2015/0207396 A1 * | 7/2015 | Ayana | H02M 1/084 |
| | | | 363/37 |
| 2020/0122580 A1 | 4/2020 | Zou | |
| 2022/0166308 A1 | 5/2022 | Blane | |
| 2023/0089299 A1 | 3/2023 | Sahoo | |
| 2023/0120453 A1 * | 4/2023 | Rao | H04L 12/2825 |
| | | | 340/4.3 |
| 2023/0120740 A1 | 4/2023 | Lewchuk | |

* cited by examiner

*Primary Examiner* — Richard V Muralidar
(74) *Attorney, Agent, or Firm* — BAKERHOSTETLER (57) ABSTRACT

A power stage circuit for AC to DC and DC to AC applications includes an AC to DC circuit having multiple totem pole circuits. Two totem pole circuits are designed for 120 VAC and may include inductors with the same inductance values. An additional totem pole circuit is a neutral line and includes an inductor with a different (e.g., lower) inductance value. By choosing inductors with the same inductance values, the 120-VAC sources can be decoupled and separately controlled (e.g., subtracted from each other on one circuit and added together on another circuit) to provide split phase AC power for a power outlet in DC to AC applications.

13 Claims, 9 Drawing Sheets

SPLIT LEG FILTERING FOR BIDIRECTIONAL POWER STAGES

INTRODUCTION

An inductor may be used to provide boost inductance in AC to DC conversions.

This application is directed to filtering in circuits, and more particularly, to selecting inductors with the same inductance value to provide enhanced filtering.

SUMMARY

The present description relates generally to AC to DC and DC to AC conversions in which inductors are used as boost inductances during AC to DC conversions, and also used as filters during DC to AC conversions. Beneficially, the inductors are reused for both conversions to reduce the number of components. Further, in DC to AC conversions, the inductors can be used as filters prior to transmission of AC power to a power outlet.

In accordance with one or more aspects of the disclosure, an apparatus is described. The apparatus may include a first line configured to receive a first voltage. The apparatus may further include a second line configured to receive a second voltage. The apparatus may further include a power stage circuit configured to receive i) the first voltage from the first line and ii) the second voltage from the second line. The power stage circuit may include a first circuit configured to subtract the first voltage from the second voltage in order to generate a first alternating current (AC) voltage based on the subtraction. The first circuit may further include a first inductor having a first inductance value. The power stage circuit may further include a second circuit configured to add the first voltage to the second voltage in order to generate a second AC voltage based on the addition. The second circuit may further include a second inductor having a second inductance equal to the first inductance value. The power stage circuit may further include a third circuit including a third inductor having a third inductance value less than the first inductance value. The apparatus may be implemented in a vehicle. The first voltage and the second voltage may provided by a battery pack in which a DC voltage stored on the battery pack is converted to an AC voltage.

The apparatus may further include a third line coupled to the third circuit. The first line and the second line may each be configured to provide the first AC voltage and the second AC voltage, respectively, based on a first switching frequency. The third line may be configured to provide a third AC voltage based on a second switching frequency less than the first switching frequency. The first switching frequency may be based on a first set of switches. The second switching frequency may be based on a second set of switches different from the first set of switches. The third circuit may provide a neutral with respect to the first AC voltage and the second AC voltage. The first AC voltage may be 180 degrees out of phase with respect to the second AC voltage.

The apparatus may further include a power outlet electrically coupled to the first AC voltage and the second AC voltage.

The apparatus may further include one or more relay matrix circuits configured to transmit power to the power outlet. In a DC to AC conversion, prior to transmitting the first AC voltage and the second AC voltage to one or more relay matrix circuits, the first AC voltage and the second AC voltage may be filtered by the first inductor and the second inductor, respectively. The power stage circuit may be configured to provide 120 VAC or 240 VAC to the power outlet.

In accordance with one or more aspects of the disclosure, a vehicle is described. The vehicle may include a power stage circuit. The power stage circuit may include a first totem pole circuit. The power stage circuit may further include a second totem pole circuit. The power stage circuit may further include a third totem pole circuit. The power stage circuit may further include a first inductor electrically coupled to the first totem pole circuit. The first inductor may include a first inductance value. The power stage circuit may further include a second inductor electrically coupled to the second totem pole circuit. The second inductor may include a second inductance value equal to the first inductance value. The power stage circuit may further include a third inductor electrically coupled to the third totem pole circuit. The third inductor may include a third inductance value different from the first inductance value.

The power stage circuit may be configured to convert an alternating current (AC) input to a direct current (DC) output to charge a battery pack. In response to a load, the power stage circuit may convert a DC input from the battery pack to an AC output, via the first totem pole circuit and the second totem pole circuit, at the load.

The vehicle may further include a port. The power stage circuit may be configured to receive the AC input from the port. The vehicle may further include a battery pack. The first inductor may be configured to receive a first voltage. The second inductor may be configured to receive a second voltage.

The power stage circuit may be configured to subtract the first voltage from the second voltage to generate a first AC voltage based on the subtraction, as well as add the first voltage to the second voltage to generate a second AC voltage based on the addition. The first voltage may be 180 degrees out of phase with respect to the second voltage. The third inductance value may be less than the first inductance value.

In accordance with one or more aspects of the disclosure, a power stage circuit is described. The power stage circuit may include a first line configured to provide a first voltage based on a first switching frequency of a switch. The power stage circuit may further include a second line configured to provide a second voltage based on the first switching frequency. The power stage circuit may further include a third line configured to provide a third voltage based on a second switching frequency less than the first switching. The third voltage may be out of phase with respect to the first voltage. The power stage circuit may be implemented in a vehicle.

The first voltage may include a first alternating current (AC) voltage, as well as a second AC voltage that is subtracted from the first AC voltage. The second voltage may include the first AC voltage added to the second AC voltage.

The power stage circuit may further include a first inductor electrically coupled to the first line, the first inductor having a first inductance value, as well as a second inductor electrically coupled to the second line. The second inductor may include a second inductance value equal to the first inductance value.

The power stage circuit may further include a third inductor electrically coupled to the third line. The third inductor may include a third inductance value less than the first inductance value.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology described herein relate to power stage circuits used in bidirectional charging. In this context, bidirectional charging refers to grid to vehicle (G2V) and vehicle to grid (V2G) applications. Power stage circuits described herein can convert alternating current (AC) to direct current (DC) to charge a DC power source (e.g., battery pack). Additionally, power stage circuits described herein can use the battery pack to generate AC voltage and provide the AC voltage to, for example, a power outlet of a vehicle. Further, the power stage circuit can provide two AC voltage signals. By incorporating a split phase AC circuit, the two AC signals are out of phase (e.g., 180 degrees out of phase) such that two 120 VAC signals can produce a 240 VAC.

As an example, power stage circuits described herein include two modules (in cases, three modules) designed as modular circuits for both AC to DC conversions (e.g., charging the battery pack) and DC to AC conversions (e.g., providing power to a power outlet). Each module may be connected to multiple lines, with some lines used for transmitting power and another line used as a neutral line. Also, each line may include an inductor. The respective inductors may be used for boost inductance, including differential boost inductance and power factor correction (PFC) boost inductance, in AC to DC conversions. Also, by using inductors on each line, the transmitted power on the lines may be filtered. For example, in DC to AC conversions, the inductors may act as low pass filters and remove at least some ripples (e.g., small voltage fluctuations) causes by switches (controlled by, for example, pulse width modulation) that output voltage a frequency above a threshold frequency. Moreover, in DC to AC conversions, the filtering may be provided prior to transmitting the AC power to relay matrices and connecting the outputs of the modules in parallel (e.g., combining the respective outputs of the modules). Beneficially, the complexity of synchronizing the modules is reduced, as synchronization of the switches is minimized or eliminated. Further, based on the relative ease of combining the respective outputs of the modules in parallel, power stage circuits described herein may provide additional load current and load power when needed.

In some embodiments, the lines transmitting power may include an inductor with the same, or substantially same (to within a specified tolerance, for example), inductance value. By using the same inductance values, the modules may provide a desired output. Further, using inductors with the same inductance values, the power stage circuit can be modeled by two single phase circuits. For example, using one modeled single phase circuit, the power stage circuit can provide differential filtering by subtracting an AC voltage on one line from an AC voltage on another line. Using an additional modeled single phase circuit, the power stage circuit can add the AC voltages together to provide additional filtering. Beneficially, the two modeled circuits can be controlled independently to generate a desired voltage.

Figure 1:
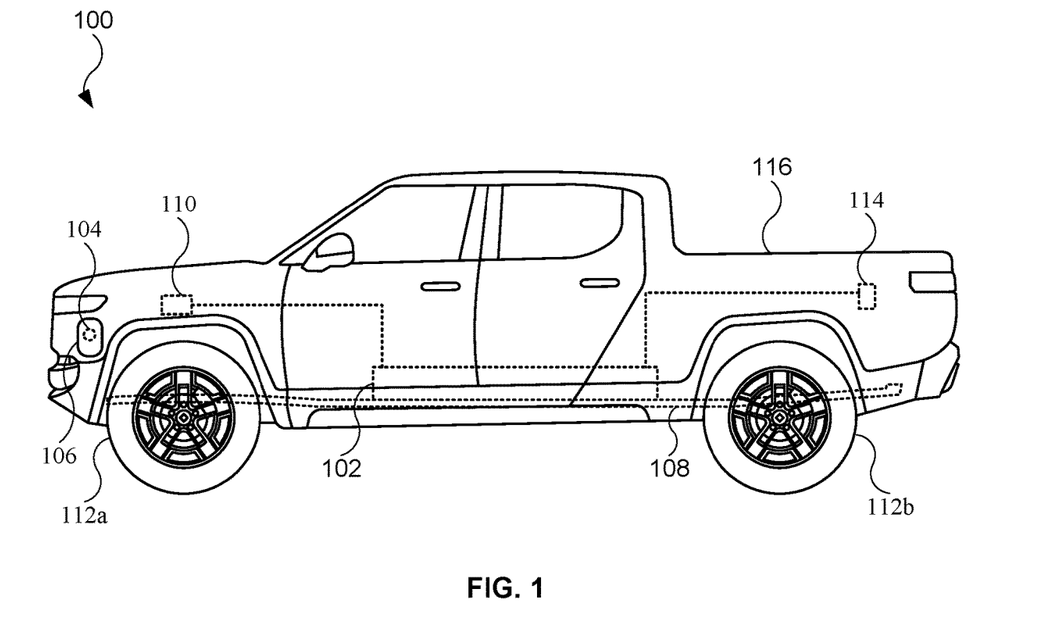
FIG. 1 illustrates an embodiment of a vehicle with a battery pack, in accordance with aspects of the present disclosure.

According to some embodiments, for example as shown in FIG. 1, an example implementation of a movable apparatus takes the form of a vehicle 100. In some embodiments, the vehicle 100 is a sport utility vehicle. In the embodiment shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, a motorcycle, a motorized scooter, or a commercial truck, as non-limiting examples. Still further, other implementation of the vehicle 100 may include sea or air transport vehicles, planes, helicopters, submarines, boats, or drones, as non-limiting examples.

As shown, the vehicle 100 includes a battery pack 102. The battery pack 102 may be coupled (e.g., electrically coupled) to one or more electrical systems of the vehicle 100 to provide power to the one or more electrical systems. The battery pack 102 may include one or more battery modules (not shown in FIG. 1), with each of the one or more battery modules carrying several battery cells. In some embodiments, the battery pack 102 does not include any battery modules and takes the form of a cell-to-pack configuration. Also, the battery cells of the battery pack 102 may include rechargeable battery cells, and accordingly, the battery pack 102 may be referred to as a rechargeable battery pack. In this regard, the vehicle 100 includes a port 104 (e.g., charge port) designed to receive a cable connector (not shown in FIG. 1) that provides power (e.g., AC power) that is converted to DC power to charge the battery pack 102. The port 104 can be accessed by moving a cover 106. The vehicle 100 may include a chassis 108 used to support the battery pack 102 and various other components (not shown in FIG. 1) of the vehicle 100, such as the suspension and differential, as non-limiting examples.

The battery pack 102 may couple to a motor 110, representative of one or more motors of the vehicle 100. In some embodiments, the motor 110 is an internal combustion engine. In the embodiment shown in FIG. 1, the motor 110 is an electric motor. In this regard, vehicle 100 can use energy (e.g., electrical energy) stored the battery pack 102 to supply power to the motor 110 to drive (e.g., rotationally drive) a wheel 112a and a wheel 112b, each representative of one or more additional wheels of the vehicle 100. By driving the wheels 112a and 112b, the vehicle 100 can move in various directions. In some embodiments, the motor 110 represents a single motor of the vehicle 100. In other embodiments, the vehicle 100 includes a dual motor configuration in which the motor 110 and an additional motor are used to drive the wheel 112a (a front wheel) and the wheel 112b (a rear wheel), respectively, as well as an additional respective front and rear wheel. Further, in other embodiments, the vehicle 100 includes a quad motor configuration in which the motor 110 and three additional motors drive a respective wheel of a four-wheel configuration of the vehicle 100.

Also, the vehicle 100 may further include a power outlet 114, representative of one or more power outlets of the vehicle 100. The power outlet 114 may include one or more plugs designed to receive a load (e.g., device that consumes/uses electrical energy, such as an appliance or consumer device). The vehicle 100 can convert the stored DC power in the battery pack 102 to AC power and provide the AC power at the power outlet 114 into which the load is plugged. While the power outlet 114 is shown in a specific location (e.g., a bed 116 of the vehicle 100), the power outlet 114 can generally be placed in one or more other locations of the vehicle 100.

Figure 2:
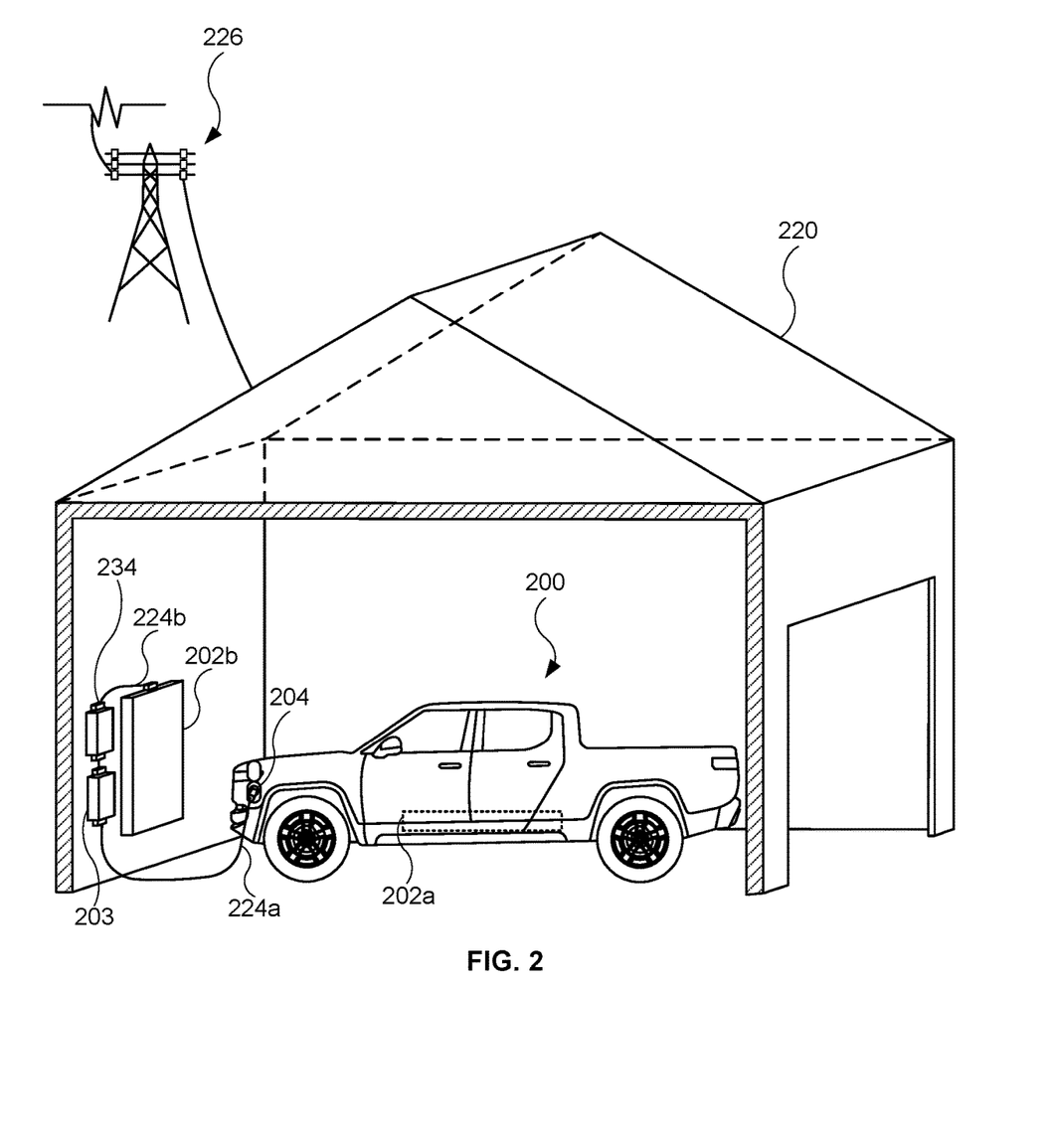
FIG. 2 illustrates an embodiment of a building with a battery pack, showing a vehicle within the building, in accordance with aspects of the present disclosure.

Referring to FIG. 2, a vehicle 200 is located in a building 220 (shown as a partial cross section) and a battery pack 202b located in the building 220. The vehicle 200 and the battery pack 202b may include any features and characteristics described herein for a vehicle and a battery pack, respectively. In some embodiments, the battery pack 202b is a wall-mounted battery pack. The building 220 may generally include any type of building for storing vehicles, such as a residential building or a commercial building, as non-limiting examples. Also, in one or more implementations, the battery pack 202b may be mounted to a wall of the building 220, as shown in FIG. 2. The battery pack 202b can couple (e.g., electrically couple) to electric vehicle supply equipment 203 (EVSE) located in the building 220. The electric vehicle supply equipment 203 can interface (e.g., electrically couple) with an electrical power system, such as solar power source, or a wind power source. As shown in FIG. 2, the electric vehicle supply equipment 203 interfaces with a power grid 226. The power grid 226 may be part of an electrical grid of a city, town, or other geographic region. Using the power grid 226, the electric vehicle supply equipment 203 a can provide power a battery pack 202a in the vehicle 200 by, for example, a cable 224a. As shown, the cable 224a is connected to a port 204 of the vehicle 200. As will be discussed further below, the vehicle 200 may include a power stage circuit (not shown in FIG. 2) used to convert power received from the electric vehicle supply equipment 203 to DC power that is used to power the battery pack 202a of the vehicle 200. Also, the electric vehicle supply equipment 203 can be used to charge the battery pack 202b in the building 220. Using the electric vehicle supply equipment 203 and a power stage circuit 234 connected to the battery pack 202b by a cable 224b, the battery pack 202b can be charged by the power grid 226.

The battery pack 202b can recharge and store energy received from the power grid 226 (or other electrical power system described herein). In some embodiments, the stored energy in the battery pack 202b can later be used to charge the battery pack 202a during, for example, instances when solar power or wind power is not available, in the case of a regional or local power outage for the building 220, and/or during a period of high rates for access to the power grid 226. This may require an additional cable (not shown in FIG. 2). Conversely, in some embodiments, the stored energy in the battery pack 202a in the vehicle 200 can be used to charge the battery pack 202b in the building 220. Also, in one or more implementations, each of the battery packs 202a and 202b can be used in bidirectional charging applications. For example, in addition to being charged by the power grid 226, the stored energy in the battery pack 202b can be provided back to the power grid 226.

The stored energy in the battery pack 202b in the building 220 can provide power to one or more loads (e.g., lights, lamps, appliances, fans, heaters, air conditioners) in the building 220. Alternatively, using an additional electrical connection (not shown in FIG. 2) connected to the port 204 of the vehicle 200 and to the building 220, the stored energy in the battery pack 202a of the vehicle 200 can be used to provide power to one or more loads in the building 220, or can provide power back to the power grid 226. Beneficially, the stored energy in the battery packs 202a and 202b can be used to power the loads in the building 220 during, for example, a period of high energy rates from the power grid 226 and can be sold back to the owner of the power grid 226.

Figure 3A:
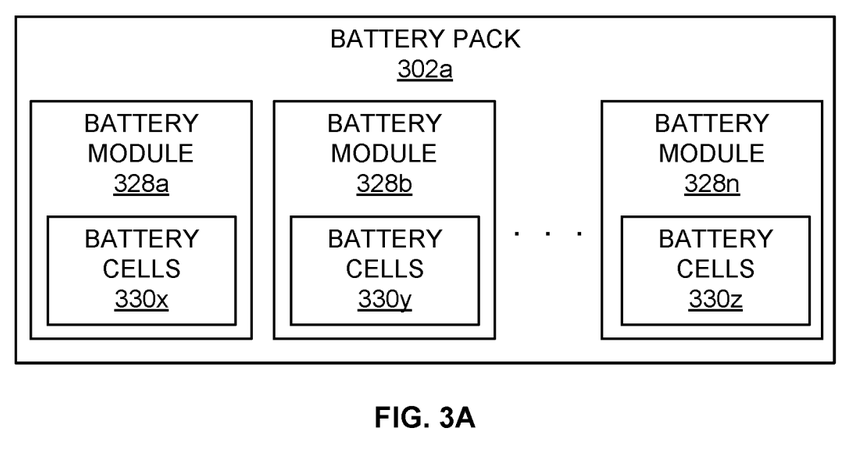
FIGS. 3A and 3B illustrate block diagrams of respective embodiments of a battery pack, in accordance with aspects of the present disclosure.
Figure 3B:
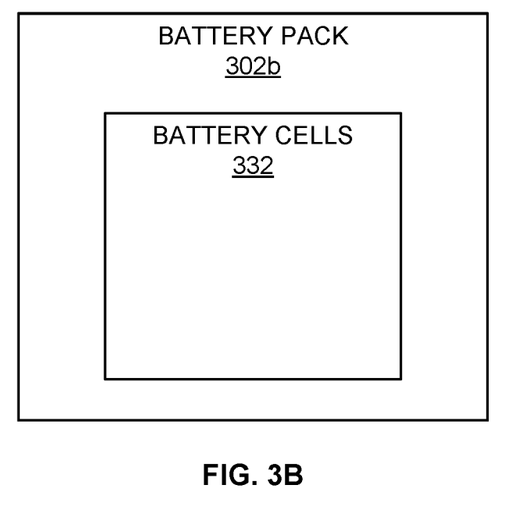

FIGS. 3A and 3B illustrate block diagrams of battery packs, which may be used in battery packs shown and/or described herein. The battery packs shown and described in FIGS. 3A and 3B can store energy and provide a DC output. Referring to FIG. 3A, a battery pack 302a includes several battery modules, each with several battery cells. As shown, the battery pack 302a includes a battery module 328a, a battery module 328b, and a battery module 328n, representing n battery modules of the battery pack 302a. The value of n may include an integer equal to three or more. However, in some embodiments (not shown in FIG. 3A), a battery pack may include one or two battery modules.

Each battery module may include several battery cells. As shown, each of the battery module 328a, the battery module 328b, and the battery module 328n includes battery cells 330x, battery cells 330y, and battery cells 330z, respectively. Each of the battery cells 330x, 330y, and 330z may represent several hundred, including several thousand, battery cells. Also, each of the battery cells 330x, 330y, and 330z may include the same number of battery cells (e.g., in each respective battery module), or may include a different number of battery cells. Also, each of the battery cells 330x, 330y, and 330z may be provided in a variety of form factors, shapes, or sizes. For example, battery cells described herein (representative of one or more battery cells of the battery cells 330*x*. 330*y*, and 330*z*) may include a cylindrical form factor. In this regard, a battery cells may include a diameter (e.g., cylinder diameter, battery cell diameter) and length (e.g., cylinder length). Further, battery cells described herein may include dimensional information derived from a 4-number code. For example, in some embodiments, a battery cell includes an XXYY battery cell, in which "XX" and "YY" refers to a diameter and length, respectively, of the battery cell. Some battery cells described herein may include a "2170" battery cell, in which the diameter is 21 millimeters (mm) and the length is 70 mm. Alternatively, some battery cells described herein may include a "4680" battery cell, in which the diameter is 46 mm and the length is 80 mm. The foregoing examples of dimensional characteristics for battery cells should not be construed as limiting, as battery cells described herein with a cylindrical form factor may include various dimensions. For example, the diameter and the length of a battery cell may be greater than 46 mm and 80 mm, respectively.

Battery cells described herein may include additional form factors. For example, battery cells (representative of one or more battery cells of the battery cells 330*x*, 330*y*, and 330*z*) may be implemented as a prismatic cell that includes a rigid or semi-rigid material, such that a housing of the battery cell is rigid or semi-rigid (e.g., not easily deformed or manipulated into another shape or form factor). Alternatively, battery cells (representative of one or more battery cells of the battery cells 330*x*. 330*y*, and 330*z*) may be implemented as a pouch cell in which a housing of the battery cell includes a flexible, malleable, or non-rigid material such that the housing can be bent, deformed, manipulated into another form factor or shape.

Referring to FIG. 3B, a battery pack 302*b* includes battery cells 332. In this regard, the battery pack 302*b* does include battery modules. Rather, the battery cells 332 represent a cell-to-pack configuration. Beneficially, the battery pack 302*b* may provide additional space for the battery cells 332 and less complexity due to the removal of battery modules. The battery cells 332 may include any number of battery cells described herein for battery cells and may take any form factor described herein for battery cells.

Figure 4:
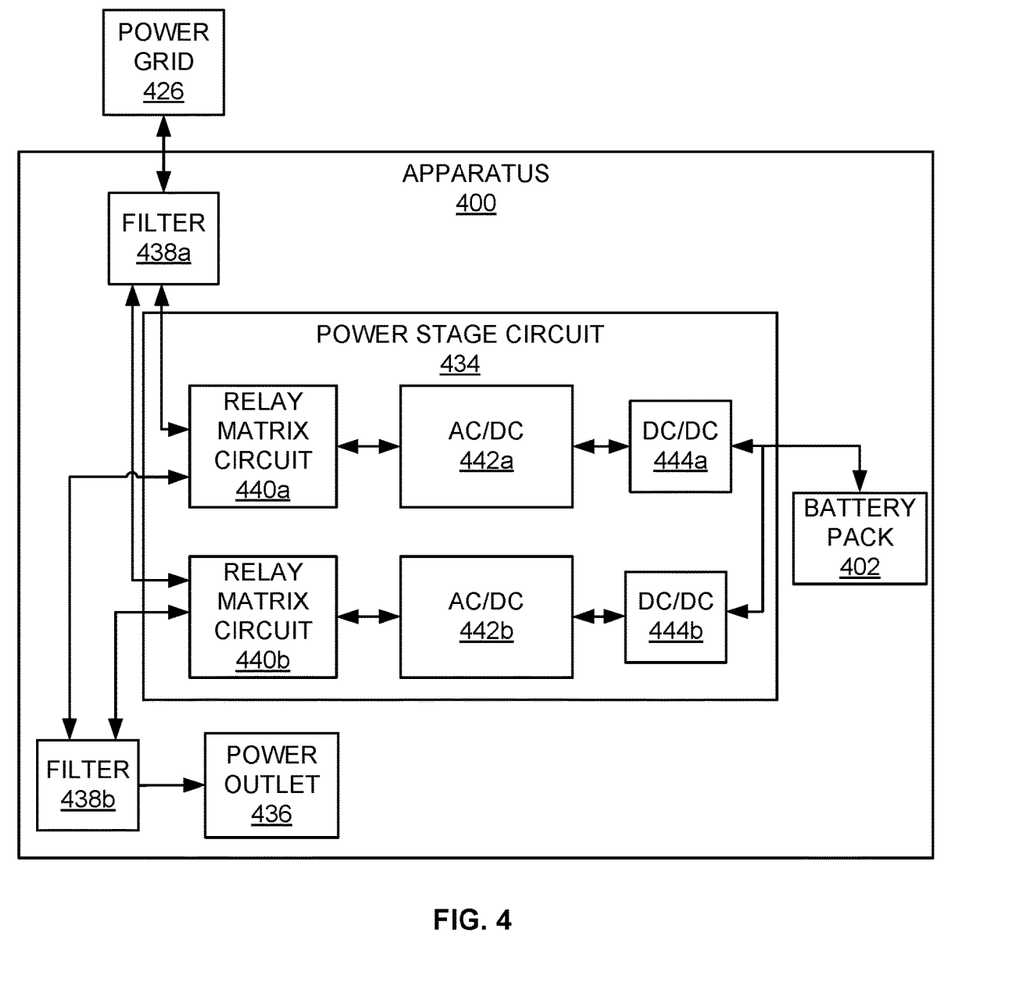
FIG. 4 illustrates a block diagram of an apparatus with a power stage circuit for AC to DC and DC to AC applications, in accordance with aspects of the present disclosure.

Referring to FIG. 4, a block diagram of an apparatus 400 is shown. In some embodiments, the apparatus 400 is a vehicle (e.g., vehicle 100, shown in FIG. 1). As shown, the apparatus 400 is connected to a power grid 426 designed to provide AC power. In some embodiments, the apparatus 400 can supply AC power back to the power grid 426. In this regard, the apparatus 400 and the power grid 426 can be used in, for example, G2V and vehicle to everything (V2X) applications. The apparatus 400 includes a power stage circuit 434 and a battery pack 402. The battery pack 402 may include any features and characteristics described herein for a battery pack.

The power stage circuit 434 is designed to receive an AC input from the power grid 426 and convert the AC power to a DC output to charge the battery pack 402. The apparatus 400 further includes a power outlet 436, representing one or more power outlets of the apparatus 400. The power stage circuit 434 is further designed to convert a DC input from the battery pack 402 to an AC output to provide AC split phase power to the power outlet 436, thus allowing the power outlet 436 to power a load connected to the power outlet 436.

The apparatus 400 may include several filters. For example, the apparatus 400 includes a filter 438*a* and a filter 438*b*. In some embodiments, the filter 438*a* is an onboard charger (OBC) electromagnetic interference (EMI) filter. In this regard, the filter 438*a* can protect the power stage circuit 434 from EMI, as well as protect other components of the apparatus 400 from EMI generated by the power stage circuit 434. In some embodiments, the filter 438*a* can be used for both G2V and V2L power flow through a charge port of a vehicle. Alternatively, in some embodiments, the filter 438*a* includes passive components (e.g., capacitors, inductors, etc.) that decrease distortion voltage and/or harmonic currents.

In some embodiments, the filter 438*b* is a DC to AC EMI filter. In this regard, the filter 438*b* can protect the power outlet 436 from unwanted EMI. The filter 438*b* may include any features and components described herein for the filter 438*a*.

The power stage circuit 434 may include a relay matrix circuit 440*a*, an AC to DC circuit 442*a*, and a DC to DC circuit 444*a*. Additionally, the power stage circuit 434 may include a relay matrix circuit 440*b*, an AC to DC circuit 442*b*, and a DC to DC circuit 444*b*. In some embodiments, each of the AC to DC circuits 442*a* and 442*b* (representative of other AC to DC circuits shown or described herein) takes the form of a power factor correction circuit designed to increase a ratio of working power to apparent power by shaping input current to be in phase with line voltage. In some embodiments, each of the AC to DC circuits 442*a* and 442*b* takes the form of an electrical or electromechanical device that converts electrical energy from one form to another. Further, in some embodiments, each of the AC to DC circuits 442*a* and 442*b* takes the form of a bidirectional AC to DC circuit, and as a result, the AC to DC circuits 442*a* and 442*b* can each convert both AC power to DC power and convert DC power to AC power.

In some embodiments, each of the DC to DC circuit 444*a* and 444*b* (representative of other DC to DC circuits shown or described herein) takes the form of a bidirectional DC to DC circuit, and as a result, the DC to DC circuits 444*a* and 444*b* can each convert DC power (e.g., first DC voltage level) to DC power (e.g., second, different DC voltage level) and convert DC power (e.g., second DC voltage level) to DC power (e.g., first DC voltage level). Accordingly, in some embodiments, each of the DC to DC circuits 444*a* and 444*b* takes the form of an electrical or electromechanical device that converts DC at one voltage level to a different voltage level. As non-limiting examples, each of the DC to DC circuits 444*a* and 444*b* may include a boost converter circuit, a buck converter circuit, or a buck-boost converter circuit. Also, in some embodiments, each of the DC to DC circuits 444*a* and 444*b* includes an input and in output that lack a direct conduction path and have independent ground. In this regard, the DC to DC circuits 444*a* and 444*b* may include a transformer that uses an electromagnetic field to transfer power to and from the battery pack 402. As a result, the AC to DC circuit 442*a* may be coupled (e.g., indirectly coupled) to the battery pack 402 by way of the DC to DC circuits 444*a* and 444*b*, respectively. Further, the AC to DC circuits 442*a* and 442*b* may provide a DC output that is not a desirable DC voltage level for charging the battery pack 402. Beneficially, each of the DC to DC circuits 444*a* and 444*b* converts the DC voltage level from the AC to DC circuits 442*a* and 442*b*, respectively, to a desirable DC voltage level to charge the battery pack 402. The voltage level is based on the battery pack 402. For example, in some embodiments, the DC to DC circuits 444*a* and 444*b* provide at least 400 VDC to charge the battery pack 402. In some embodiments, the DC to DC circuits 444*a* and 444*b* provide at least 800 VDC.

In some embodiments, each of the relay matrix circuits 440a and 440b take the form of a configuration relay matrix. In this regard, the relay matrix circuits 440a and 440b may include one or more relay circuits designed to switch current based on the applications. For example, during G2V charging applications, the relay matrix circuits 440a and 440b can switch and permit AC power from the power grid 426 to the AC to DC circuit 442a and the AC to DC circuit 442b, respectively. Conversely, during V2G or V2L applications, the relay matrix circuits 440a and 440b can switch and permit AC power from the AC to DC circuit 442a and the AC to DC circuit 442b, respectively, to the power grid 426. Additionally, when a load is connected to the power outlet 436, the relay matrix circuits 440a and 440b can switch and permit AC power from the AC to DC circuit 442a and the AC to DC circuit 442b, respectively, to the power outlet 436 to power the load. Also, the AC to DC circuit 442a and the AC to DC circuit 442b may be modular circuits that are connected together in series to provide a split phase AC output for the power outlet 436. This will be shown and described in further detail below.

In an exemplary implementation, the AC to DC circuits 442a and 442b convert an AC input (e.g., provided by the power grid 426) to a DC output, which is further converted by the DC to DC circuit 444a and the DC to DC circuit 444b, respectively, and the resulting DC power is used to charge the battery pack 402. Additionally, based on their respective bidirectional capabilities, the AC to DC circuits 442a and 442b are designed to convert an DC input from the DC to DC circuit 444a and the DC to DC circuit 444b, respectively, provided (e.g., indirectly provided) by the DC power stored on the battery pack 402 to an AC output, which can be used to provide AC power back to the power grid 426 or to provide AC power to the power outlet 436.

Figure 5:
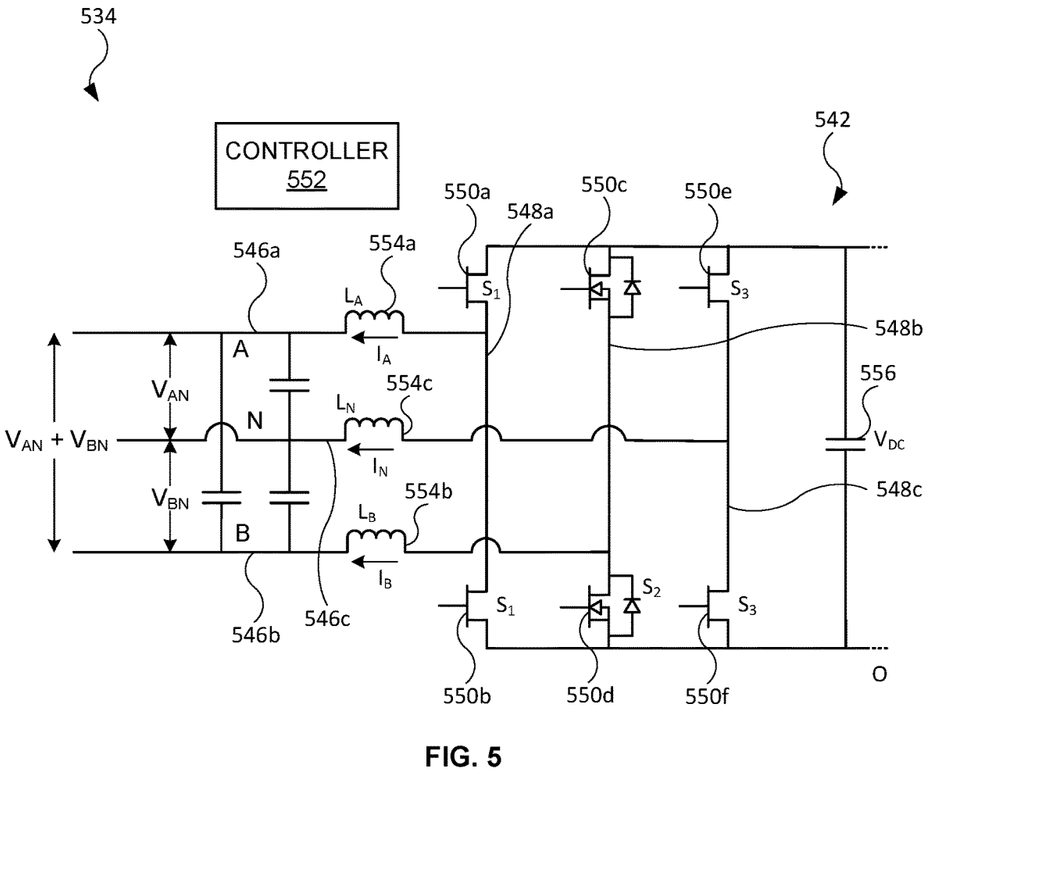
FIG. 5 illustrates a circuit diagram of an AC to DC, in accordance with aspects of the present disclosure.

Referring to FIG. 5, an exemplary circuit diagram for an AC to DC circuit 542 is shown. The AC to DC circuit 542 may be part of a power stage circuit 534 shown and described herein. The power stage circuit 534 may provide additional components and features that may be implemented in the power stage circuit 434 (shown in FIG. 4). In this regard, the power stage circuit 534 may be implemented in an apparatus (e.g., apparatus 400, shown in FIG. 4). Further, the circuitry shown for the power stage circuit 534 may be integrated with a respective AC to DC circuit (e.g., AC to DC circuit 442a and AC to DC circuit 442b) of the power stage circuit 534. In this regard, the AC to DC circuit 542 may represent one of the AC to DC circuits 442a and 442b (shown in FIG. 4).

As shown, the power stage circuit 534 includes a line 546a, a line 546b, and a line 546c. The term "line" or "lines" as used in the detailed description and in the claims represents a wire, wiring, or metal trace that is capable of transmitting electrical current and connecting electrical components together to form one or more electrical connections. The lines 546a and 546b are designed to receive a voltage from an AC to DC circuit. For example, the line 546a and the line 546b can carry a voltage from an AC to DC circuit. In this regard, the lines 546a and 546b may represent two lines (e.g., poles L1, or $L_A$, and L2 or $L_B$, respectively) of an AC circuit, and the line 546c may represent a neutral (N) line (e.g., neutral voltage) of the AC circuit, including a common neutral line for the lines 546a and 546b.

The power stage circuit 534 further includes a circuit 548a, a circuit 548b, and a circuit 548c. In some embodiments, each of the circuits 548a, 548b, and 548c takes the form of a totem pole circuit. In this regard, each of the circuits 548a, 548b, and 548c may include a pair of switches (e.g., transistor switches). As shown, the circuit 548a includes a switch 550a and a switch 550b, the circuit 548b includes a switch 550c and a switch 550d, and the circuit 548c includes a switch 550e and a switch 550f. Each of the aforementioned switches may take the form of a transistor switch, such as a metal-oxide-semiconductor field-effect transistor (MOSFET) switch, as a non-limiting example.

In order to control/operate the aforementioned switches, a controller 552 can be used. The controller 552 may be implemented as a control circuit integrated with the power stage circuit 534 or may be separate from the power stage circuit 534. In some embodiments, the controller 552 includes processing circuitry, such as a central processing unit, a microelectromechanical (MEMS) controller, one or more microcontrollers, an application-specific integrated circuit, or a combination thereof. The controller 552 can control switching functionality (e.g., whether the switch is open or closed) of the switches. In this regard, the controller 552 can be programmed to operate a pair of switches on a circuit to perform various duties (e.g., rectifier in AC to DC conversion, transmission of control signals). Additionally, the controller 552 can be programmed to control the switching frequency (e.g., the rate at which the switches open and close), which may be used to, for example, control the rate at which AC voltage switches polarity. In some embodiments, the controller 552 includes a pulse width modulation (PWM) converter that provides switching frequency control signals to the switches. In this regard, the controller 552 can provide can control the average voltage to the lines 546a and 546b by adjusting a duty cycle of the voltage provided to the switches 550a and 550b (to control the voltage on the line 546a) and to the switches 550c and 550d (to control the voltage on the line 546b). A "duty cycle" refers to a ratio of an active (e.g., high) pulse to a period (e.g., high and low) of a waveform.

Moreover, the switching frequency for the switches can vary. For example, the switching frequency for the switches 550a and 550b on the circuit 548a and the switching frequency for the switches 550e and 550f on the circuit 548c may switch, based on control signals from the controller 552, at a frequency approximately in the range of 1 kilohertz (kHz) to 150 kHz. In some embodiments, the switching frequency is 120 kHz. Conversely, the switching frequency for the switches 550c and 550d on the circuit 548b may switch, based on control signals from the controller 552, at a frequency approximately in the range of 50 to 60 Hz. In some embodiments, the switching frequency is 60 Hz. Accordingly, switches on some circuits (e.g., switches 550a and 550b on the circuit 548a) are switched at a higher switching frequency as compared to switches on other circuits (e.g., switches 550c and 550d on the circuit 548b).

The power stage circuit 534 may include several inductors. For example, the power stage circuit 534 includes an inductor 554a on the line 546a, an inductor 554b on the line 546b, and an inductor 554c on the line 546c. The inductors 554a, 554b, and 554c can provide benefits for multiple applications. For example, the inductors 554a and 554b can provide a PFC inductance in AC to DC applications, as well as provide filtering (e.g., low pass filtering) in DC to AC applications. In some embodiments, the inductance value (e.g., measured in Henries, or H) of the inductor 554a is the same as that of the inductor 554b. For example, in some embodiments, the respective inductance values of the inductors 554a and 554b is approximately in the range of 100 microhenries (μH) to 150 μH. In some embodiments, the respective inductance values of the inductors 554a and 554b is 125 μH. Accordingly, the overall inductance of the inductors 554a and 554b can be split and distributed on different lines, as shown in FIG. 5. Additionally, in some embodiments, the inductance value of the inductor 554c is different from (e.g., less than) that of the inductance value of the inductor 554a or the inductance value of the inductor 554b. For example, in some embodiments, the inductance value of the inductor 554c is approximately in the range of 10 µH to 40 µH. In some embodiments, the inductance value of the inductor 554c is 25 µH. The relationship among the inductors 554a, 554b, and 554c may be governed by the expression $$L_A = L_B \neq L_N \tag{1}$$

where $L_A$, $L_B$, and $L_N$ represents respective inductance values of the inductor 554a, the inductor 554b, and the inductor 554c. According to one approach, two lines are used to provide AC, where one line includes a relatively high inductance, and the other line includes a relatively low inductance. However, in the approach described herein, a third line (e.g., neutral line) is added and the relatively high inductance split among two lines (e.g., two lines other than the neutral line). Beneficially, the overall inductance in this approach can be reduced. Further, by splitting the inductance into equal inductances on two lines, each line can be used in filtering applications and the inductor on the neutral line can be reduced, which can lead to a lower cost and a smaller footprint. Further, the use of equal inductances on the lines can provide single phase circuit modeling. This will be further discussed below.

In a DC to AC application implemented by the power stage circuit 534, it is desirable to synchronize the respective AC voltages on the lines 546a and 546b. The terms "synchronize" or "synchronization" may refer to causing the respective frequencies of voltages on the lines 546a and 546b to operate at the same rate and/or the same time. Moreover, it may be desired that the respective voltages on the lines 546a and 546b are out of phase (e.g., 180 degrees out of phase). In order to synchronize the respective AC voltages, the respective circuitry that provides an AC voltage to the line 546a (e.g., circuit 548a and switches 550a and 550b) and the line 546b (e.g., circuit 548b and switches 550c and 550d) can be controlled and processed using different control circuits. In this regard, a dynamic (e.g., differential) equation governing the voltages through the power stage circuit 534 can be governed in part by the expression $$L_A \frac{dI_A}{dt} = S_1 V_{DC} - V_{AN} - V_{NO} \tag{2}$$

where $dI_A/dt$ is the change in current ($I_A$) through the inductor 554a, $S_1$ is the switching function (e.g., as a function of time, $S1(t)=1$ if the switch S1 (switch 550a or switch 550b) is on, and $S1(t)=0$ if the switch S1 is off) of the switches 550a and 550b, $V_{DC}$ is the DC voltage produced by a charge on a capacitor 556 of the power stage circuit 534, VAN is the AC voltage on the line 546a with respect to line 546c (N, or neutral), and $V_{NO}$ is the AC voltage on the line 546c (N) with respect to point O in FIG. 5. In some embodiments, $V_{AN}$ is 120 VAC. Additionally, a dynamic equation governing the voltages through the power stage circuit 534 can be expressed in part by $$L_b \frac{dI_B}{dt} = S_2 V_{DC} - V_{BN} - V_{NO} \tag{3}$$

where $dI_B/dt$ is the change in current ($I_B$) through the inductor 554b, $S_2$ is the switching function (e.g., as a function of time, $S2(t)=1$ if the switch S2 (switch 550c or switch 550d) is on, and $S2(t)=0$ if the switch S2 is off) of the switches 550c and 550d, and $V_{BN}$ is the line-to-neutral AC voltage on the line 546b. In some embodiments, $V_{BN}$ is 120 VAC. Additionally, a dynamic equation governing the voltages through the power stage circuit 534 can be expressed in part by the expression $$L_n \frac{dI_B}{dt} = S_3 V_{DC} - V_{NO} \tag{4}$$

where $dI_N/dt$ is the change in current ($I_N$) through the inductor 554c and S3 is the switching function (e.g., as a function of time, $S3(t)=1$ if the switch S3 (switch 550e or switch 550f) is on, and $S3(t)=0$ if the switch S3 is off) of the switches 550e and 550f.

Using Eq. 1 and a subtraction of Eq. 3 from Eq. 2 results in $$L \frac{dI_d}{dt} = Vpwm_{AB} - V_{AB} \tag{5}$$

$$I_d = I_A - I_B \tag{6}$$

$V_{pwm,AB}$ is the voltage due to PWM control by the controller 552 and is defined as an average by $$V_{pwm,AB} \stackrel{def}{=} \overline{(S_1 - S_2)V_{DC}} \tag{7}$$

and $$V_{AB} = V_{AN} - V_{BN}. \tag{8}$$

Using Eq. 1. adding Eqs. 2 and 3 results in $$L \frac{d(I_A + I_B)}{dt} = (S_1 + S_2)V_{DC} - (V_{AN} + V_{BN}) - 2V_{NO}. \tag{9}$$

Using the Expression $$-I_N = I_B + I_B \tag{10}$$

and adding 2*Eq. 4 to Eq. 9, then (after simplification of terms)

$$(L + 2L_N) \frac{di_n}{dt} = V_{pwm,N} + (V_{AN} + V_{BN}) \tag{11}$$

where $V_{pwm,N}$ is the voltage due to PWM control by the controller 552 and is expressed as $$-V_{pwm,N} = V_{pwm,A} + V_{pwm,B} \tag{12}$$

$$\text{where } V_{pwm,A} = \overline{S_1 V_{DC}} \tag{13}$$

$$\text{and } V_{pwm,B} = \overline{S_2 V_{DC}}. \tag{14}$$

Eqs. 5 and 11 show that the circuit dynamics of the power stage circuit 534 with respect to the voltage on the lines 546a and 546b can be decoupled and independently controlled. For example, Eqs. 2-5 show a differential (e.g., difference) between the respective voltages across the lines 546a and the 546b when the inductors $L_A$ and $L_B$ are equal to each other, as shown in Eq. 1. The terms in Eq. 5 are not dependent upon any terms in Eq. 11. Conversely, Eqs. 9-11 show a common mode (e.g., summation) of the respective voltages across the lines 546a and 546b when the inductors $L_A$ and $L_B$ are equal to each other, as shown in Eq. 1. The terms in Eq. 11 are not dependent upon any terms in Eq. 5. Beneficially, the voltage and current through the lines 546a and 546b can be controlled independently by two circuits, i.e., a differential circuit and a common mode circuit. Moreover, the overall synchronization of respective voltages on the lines 546a and 546b is less complex, as the synchronization of switching of the switches (of the power stage circuit 534) is not required.

Further, based upon the respective AC voltages on the lines 546a ($V_{AN}$) and 546b ($V_{BN}$) and the synchronization provided by the power stage circuit 534, the power stage circuit 534 may provide the respective AC voltages as split phase AC output. For example, when the respective voltages on the lines 546a and 546b are 180 degrees out of phase ($V_{AN}$=120 V and $V_{BN}$=−120V), the summation of $V_{AN}$ and $V_{BN}$=0 VAC. However, by taking the difference between $V_{AN}$ and $V_{BN}$, the power stage circuit 534 can output a difference equal to $2*V_{AN}$ or $2*V_{BN}$ (when $V_{AN}$=$V_{BN}$). Accordingly, when $V_{AN}$=$V_{BN}$=120 VAC, the AC output from the power stage circuit 534 may include a 240 VAC output. Beneficially, a power outlet (e.g., power outlet 436 in FIG. 4) connected to the power stage circuit 534 can provide 120 VAC or 240V to a load plugged into the power outlet, depending upon the load demands.

Figure 6:
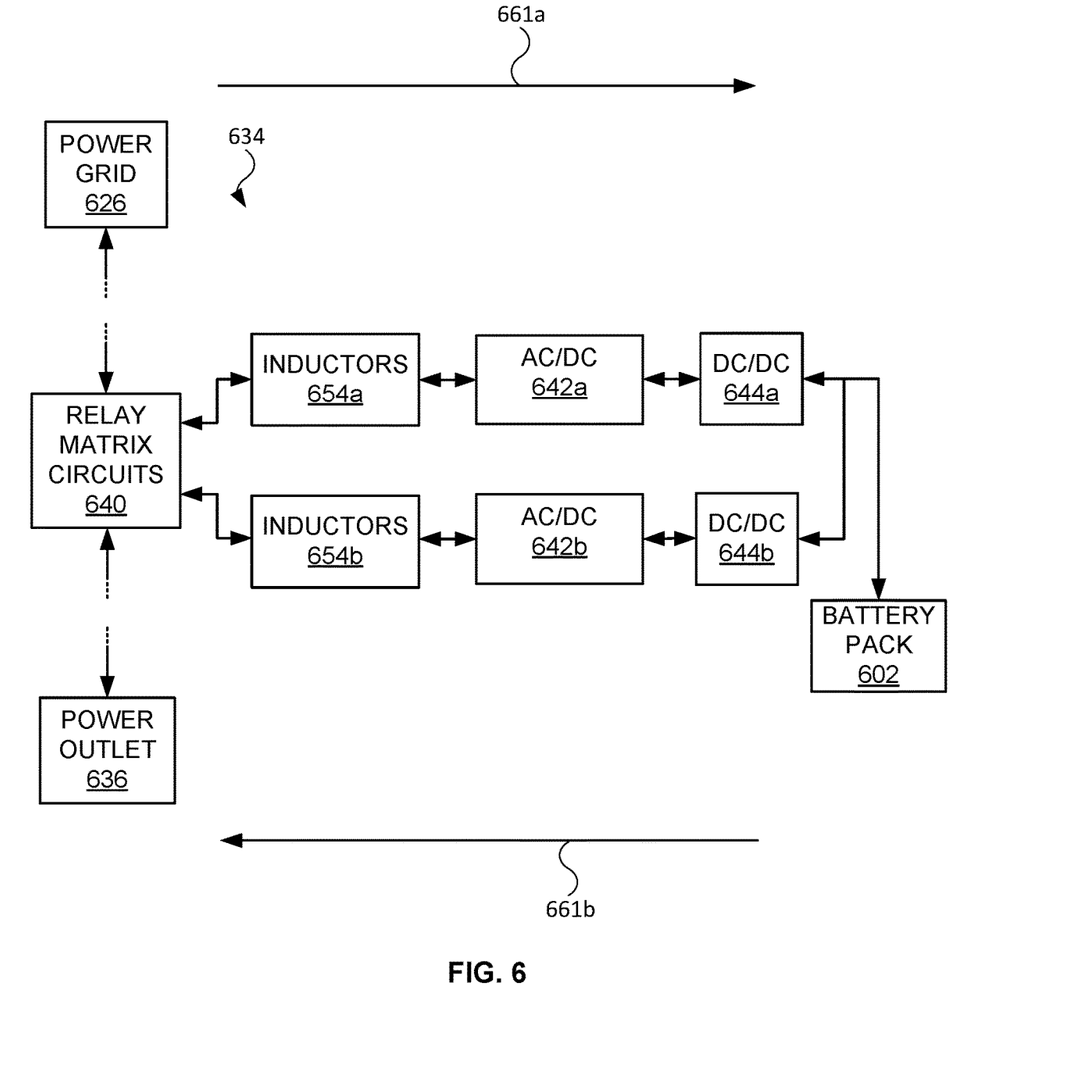
FIG. 6 illustrates a block diagram of power stage circuits, in accordance with aspects of the present disclosure.

Referring to FIG. 6, a block diagram of a power stage circuit 634 is shown. The features shown and described in FIG. 6 may be applied to other power stage circuits shown and described herein (e.g., power stage circuits 434 and 534 shown in FIGS. 4 and 5, respectively). The power stage circuit 634 may include bidirectional capabilities. In this regard, an arrow 661a represents a general direction in which components are sequentially used for AC to DC conversion to, for example, convert AC power (from a power grid 626) to DC power and provide DC power to charge a battery pack 602. Further, an arrow 661b (in a direction opposite the arrow 661a) represents a general direction in which the components are sequentially used for DC to AC conversion to, for example, discharge a battery pack 602 and provide AC power to either the power grid 626 6 or a power outlet 636. Also, although not expressly shown, additional filters (e.g., EMI filters) may be incorporated into the power stage circuit 634.

During AC to DC conversion, relay matrix circuits 640 (representative of multiple relay matrix circuits) can receive AC power from the power grid 626 and provide the AC power to the inductors 654a and to the inductors 654b. Each of the inductors 654a and 654b may represent multiple inductors. For example, the inductors 654a may include three inductors, which each inductor on a respective line, similar to inductors 554a, 554b, and 554c (shown in FIG. 5). The inductors 654b may include a similar configuration as that of the inductors 654a.

The DC output from the inductors 654a and the inductors 654b is then provided to a AC to DC circuit 642a and a AC to DC circuit 642b, respectively. Each of the AC to DC circuits 642a and 642b may include a modular circuit (or circuits). Each of the AC to DC circuits 642a and 642b may include several totem pole circuits with an inductor of the inductors 654a and 654b, respectively, on each line to the AC to DC circuits 642a and 642b. By splitting and distributing the inductance of the inductors 654a and 654b onto different lines, the inductors 654a and 654b may be used as boost inductors during an AC to DC conversion. The DC output from the AC to DC circuit 642a and the AC to DC circuit 642b can be provided to a DC to DC circuit 644a and a DC to DC circuit 644b. Each of the DC to DC circuits 644a and 644b may include a transformer in isolation. In this regard, the DC to DC circuits 644a and 644b can transform (e.g., transform up) the DC input power (from the AC to DC circuits 642a and 642b) to a DC output power at the respective outputs. Further, the respective DC output provided by each of the DC to DC circuits 644a and 644b can be used to charge the battery pack 602.

During DC to AC conversion, each of the DC to DC circuits 644a and 644b can transform (e.g., transform down) the DC input power (from the battery pack 602) to a DC output power at respective outputs of the DC to DC circuits 644a and 644b. Accordingly, each of the DC to DC circuits 644a and 644b is a bidirectional DC to DC circuit for both AC to DC and DC to AC conversions. Further, the respective DC output provided by the DC to DC circuit 644a and the DC to DC circuit 644b can then be provided to the AC to DC circuit 642a and the AC to DC circuit 642b, respectively. Each of the AC to DC circuits 642a and 642b may include several switches (e.g., MOSFET switches) controlled by, for example, a PWM controller (not shown in FIG. 6). Further, each of the AC to DC circuits 642a and 642b are used to convert the received DC input to an AC output, and accordingly, each of the AC to DC circuits 642a and 642b may be referred to as a bidirectional AC to DC circuit or bidirectional modular circuit.

The output provided by the AC to DC circuit 642a and the AC to DC circuit 642b is transmitted through the inductor 654a and the inductor 654b, respectively. The inductors 654a and 654b can be used as filters (e.g., low pass filters) to filter out ripples (e.g., voltage fluctuation). Beneficially, by positioning the inductors 654a and 654b before the relay matrix circuits 640 (in a DC to AC conversion), the inductors 654a and 654b are reused (e.g., in additional to being used for boost inductance) as filters in the DC to AC conversion. The AC output from the inductors is transmitted to the relay matrix circuits 640. By filtering the respective outputs of the AC to DC circuits 642a and 642b prior to transmitting to the relay matrix circuits 640, the filtered outputs can be synchronized with less complexity, as the respective switches of the AC to DC circuits 642a and 642b require little or no synchronization. The relay matrix circuits 640 can transmit the AC power to the power grid 626 or to the power outlet 636. Accordingly, the relay matrix circuits 640 may electrically couple to the power grid 626. When provided to the power outlet 636, the respective, filtered outputs of the AC to DC circuits 642a and 642b, as modular circuits, can be combined in parallel to provide more power at the power outlet 636, based on load requirements.

Figure 7:
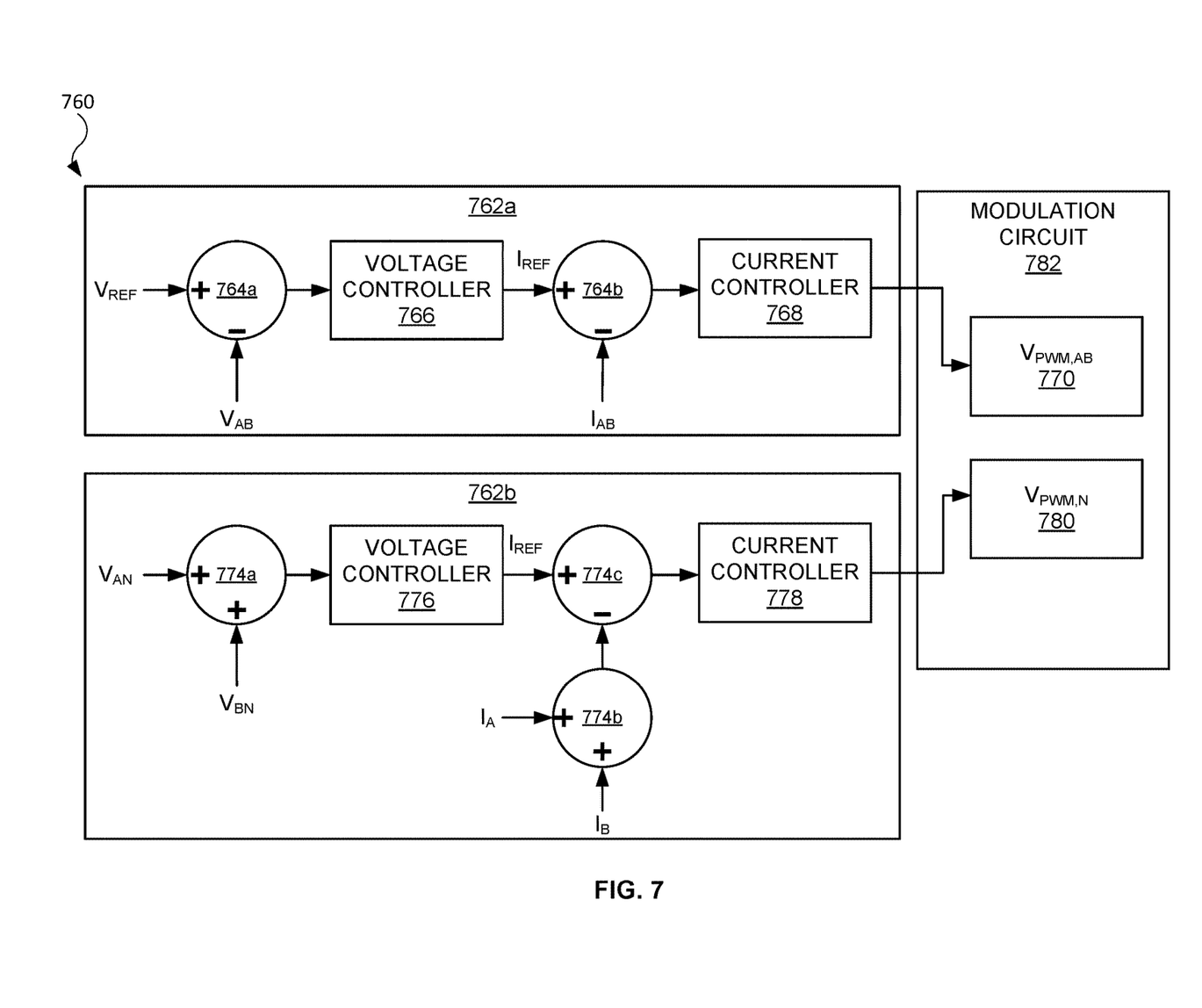
FIG. 7 illustrates a schematic diagram showing a system for managing voltage, in accordance with aspects of the present disclosure.

Referring to FIG. 7, a schematic diagram of a system 760 is shown. The system 760 may take the form of control circuitry designed to control voltage in, for example, DC to AC applications. In some embodiments, the system 760 is integrated with the power stage circuit 534 (shown in FIG. 5) and is designed to control at least some of voltages generated by the power stage circuit 534. In this regard, power stage circuits described herein can carry out the various features shown and described for the system 760.

The system 760 may include multiple control system to independently control AC voltage. For example, the system 760 includes a control circuit 762a designed to provide a differential voltage and generate an output voltage using a difference between two line voltages (e.g., a difference between $V_{AN}$ and $V_{BN}$ on the lines 546a and 546b, respectively, shown in FIG. 5). Additionally, the system 760 includes a control circuit 762b designed to provide a common mode voltage and generate an output voltage using a summation between two line voltages (e.g., a summation of $V_{AN}$ and $V_{BN}$ on the lines 546a and 546b, respectively, shown in FIG. 5). Due in part to the decoupling of terms between Eqs. 5 and 11, the control circuits 762a and 762b can determine, by modeling respective single phase circuits, respective voltages without cross-coupling terms. Put another way, the control circuit 762a can determine a voltage without relying on the control circuit 762b (including any outputs of the control circuit 762b), and vice versa.

The control circuit 762a may include a circuit 764a (e.g., subtraction block circuit) that receives a reference voltage $V_{REF}$ and a voltage $V_{AB}$. The reference voltage $V_{REF}$ provides a voltage command value and the voltage $V_{AB}$ is the difference between the voltages $V_{AN}$ and $V_{BN}$. In some embodiments, the voltages $V_{AN}$ and $V_{BN}$ are 180 degrees out of phase. In this regard, the voltage $V_{AB}$ is equal to 240 VAC output when $V_{AN}$ and $V_{BN}$ are 120 VAC. Accordingly, the reference voltage $V_{REF}$ is 240 VAC and is designed to control the voltage $V_{AB}$ to 240 VAC.

The control circuit 762a may further include a voltage controller 766 designed to receive an input, based on a determined difference between values, from the circuit 764a. As non-limiting examples, the voltage controller 766 may include circuitry that takes the form of a proportional integral controller, a proportional resonance controller, or a combination thereof. The voltage controller 766 may form part of a feedback loop designed to maintain an output voltage at a desired voltage level (e.g., 240 VAC).

The control circuit 762a may further include a circuit 764b (e.g., subtraction block circuit) that receives a reference current $I_{REF}$ and a current $I_{AB}$. The current $I_{AB}$ is the difference between a current on one 120 VAC line (e.g., IA in FIG. 5) and a current on another 120 VAC line (e.g., $I_B$ in FIG. 5). The reference current $I_{REF}$ provides a current command value for the current $I_{AB}$ to control the current to a specified value. The control circuit 762a further includes a current controller 768 designed to receive an input, based on a determined difference between values, from the circuit 764b. As a non-limiting example, the current controller 768 may include a proportional integral controller. The current controller 768 may form part of a feedback loop designed to maintain an output current at a desired current level.

The current controller 768 is designed to output a voltage 770 ($V_{pwm,AB}$). The voltage 770 may include on a PWM-controlled voltage corresponding to a voltage (e.g., average voltage) based in part upon the switching frequencies of the switches 550a, 550b, 550c, and 550d (shown in FIG. 5). Put another way, the voltage 770 is based in part on the voltages $V_{AN}$ and $V_{BN}$ (shown in FIG. 5).

The control circuit 762b may include a circuit 774a (e.g., addition block circuit) that receives the voltages $V_{AN}$ and $V_{BN}$. When the voltages $V_{AN}$ and $V_{BN}$ are 180 degrees out of phase, the summation of $V_{AN}$ and $V_{BN}$ is equal to 0 V. Although not expressly shown, the summation of $V_{AN}$ and $V_{BN}$ may be compared with a reference voltage equal to 0 V.

The control circuit 762b may further include a voltage controller 776 designed to receive an input, based on the summation of values, from the circuit 774a. The voltage controller 776 may include any features described herein for the voltage controller 766 and may form part of a feedback loop designed to maintain an output voltage at a desired voltage (e.g., 0 V).

The control circuit 762b may further include a circuit 774b (e.g., addition block circuit) that receives a current IA and a current $I_B$. The control circuit 762b may further include a circuit 774c (e.g., addition block circuit) that receives a reference current $I_{REF}$ for the summation of the currents IA and $I_B$. The control circuit 762b further includes a current controller 778 designed to receive an input, based on the determined difference, from the circuit 774c. The current controller 778 may include a proportional integral controller. The current controller 768 may form part of a feedback loop designed to maintain an output current at a desired current.

The control circuit 762a further includes a current controller 768 designed to receive the difference from the circuit 764b. As a non-limiting example, the current controller 778 may include any features described herein for the current controller 768 and may form part of a feedback loop designed to maintain an output current at a desired current.

The current controller 778 is designed to output a voltage 780 ($V_{PWM,N}$). The voltage 780 may include on a PWM-controlled voltage corresponding to a voltage (e.g., average voltage) based in part upon the switching frequencies of the switches 550e and 550f (shown in FIG. 5).

The system 760 further includes a modulation circuit 782 that receives the voltages 770 and 780 (e.g., PWM-based voltages). The modulation circuit 782 may include circuitry that allows for integration of multiple totem pole circuits (e.g., circuits 548a, 548b, and 548c, shown in FIG. 5). Further, the modulation circuit 782 allow circuits with switches programmed for relatively fast switching frequencies (e.g., circuit 548a with switches 550a and 550b, and circuit 548c with switches 550c and 550f, shown in FIG. 5) and circuits with switches programmed for relatively slow switching frequencies (e.g., circuit 548b with switches 550c and 550d, shown in FIG. 5). The output from the modulation circuit 782 may include a 120 VAC output or 240 VAC output, along with the output from the neutral line.

Figure 8:
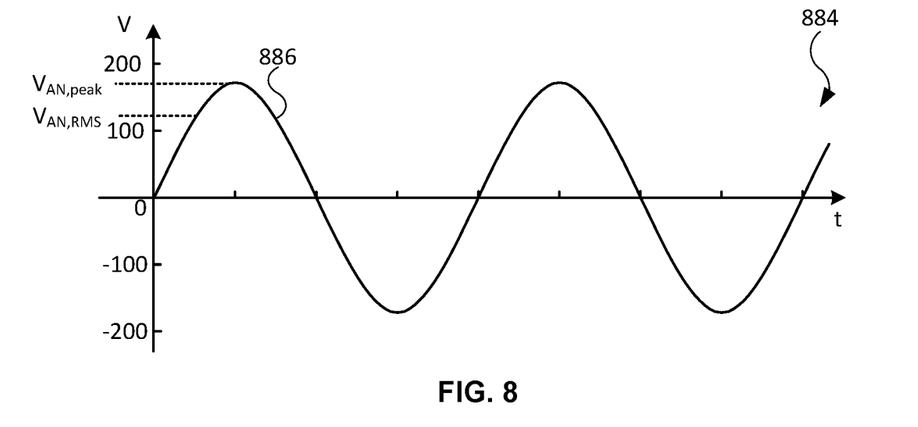
FIG. 8 illustrates a graph showing a curve for a line-to-neutral voltage, in accordance with aspects of the present disclosure.
Figure 9:
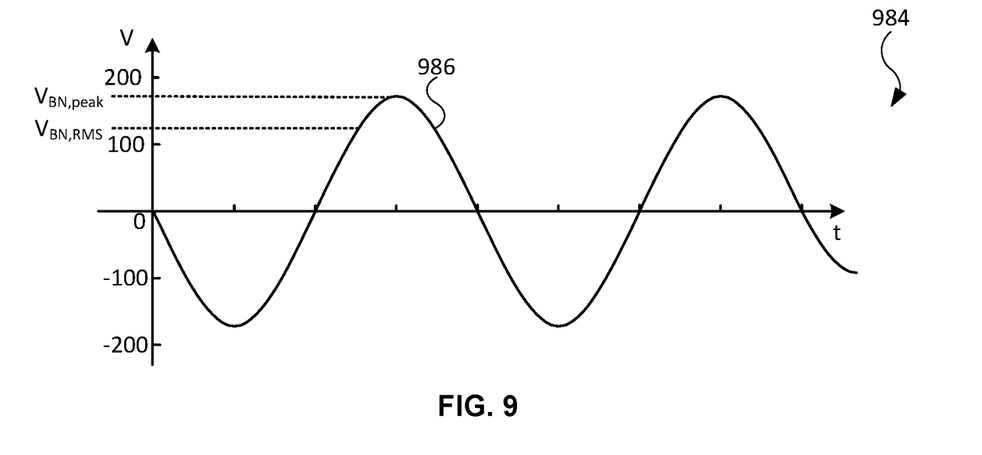
FIG. 9 illustrates a graph showing a curve for an alternate line-to-neutral voltage, in accordance with aspects of the present disclosure.
Figure 10:
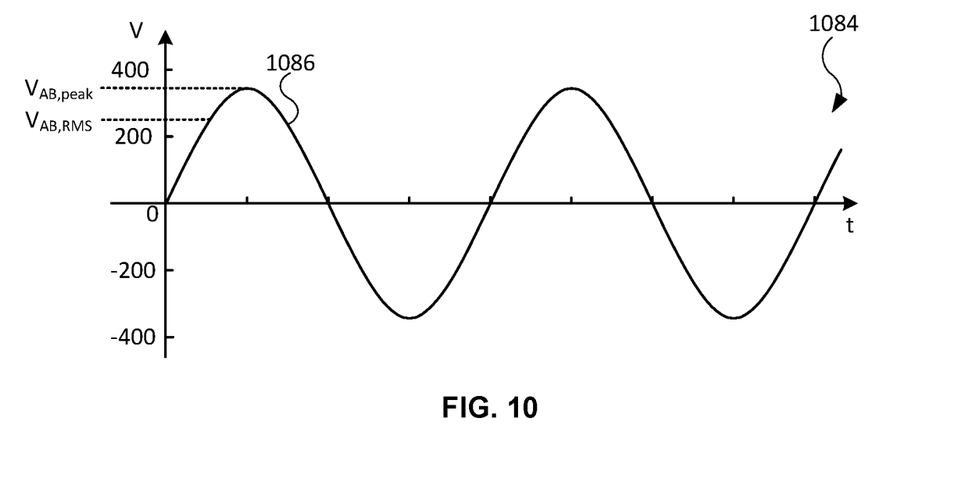
FIG. 10 illustrates a graph showing a curve for a line-to-line voltage, in accordance with aspects of the present disclosure.

FIGS. 9-10 illustrate graphs showing voltage over time from, for example, the AC outputs shown in FIG. 5. Each of the respective graphs illustrate curves with sinusoidal waveforms. Referring to FIG. 8, a graph 884 illustrates a curve 886 showing line-to-neutral voltage. The line-to-neutral voltage (e.g., differential between a line voltage and neutral) may represent $V_{AN}$ shown in FIG. 5. As shown, a peak voltage ($V_{AN,peak}$) is approximately 170 VAC and a root mean square (RMS) voltage ($V_{AN,RMS}$) is approximately 120 VAC.

Referring to FIG. 9, a graph 984 illustrates a curve 986 showing line-to-neutral voltage. The line-to-neutral voltage may represent $V_{BN}$ shown in FIG. 5. As shown, a peak voltage ($V_{BN,peak}$) is approximately 170 VAC, and an RMS voltage ($V_{BN,RMS}$) is approximately 120 VAC. Further, FIGS. 8 and 9 show the voltages $V_{AN}$ and $V_{BN}$ are 180 degrees out of phase.

Referring to FIG. 10, a graph 1084 illustrates a curve 1086 showing line-to-line voltage. The line-to-line voltage (e.g., differential between two line voltages) may represent $V_{AB}=V_{AN}-V_{BN}$ shown in FIG. 5. The line-to-line voltage also represents a difference between the curves 886 and 986 shown in FIGS. 8 and 9, respectively. Based on the voltages $V_{AN}$ and $V_{BN}$ being 180 degrees out of phase, the peak and RMS voltage for the line-to-line voltage is doubled. As shown, a peak voltage ($V_{AB,peak}$) is approximately 340 VAC and an RMS voltage ($V_{AB,RMS}$) is approximately 240 VAC.

Figure 11:
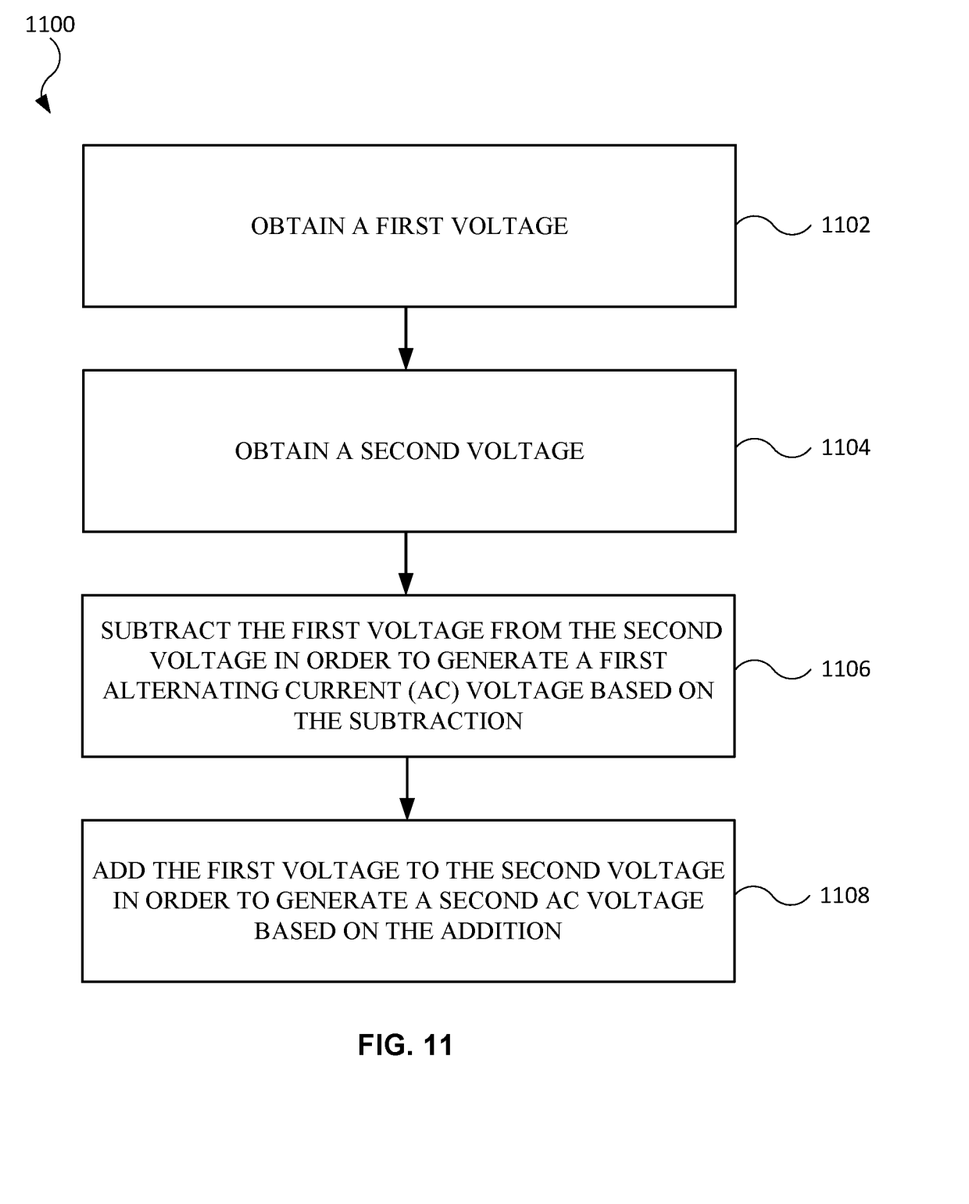
FIG. 11 illustrates a flowchart showing a method for providing power, in accordance with aspects of the present disclosure.

Referring to FIG. 11, a flowchart 1100 showing a method for providing power is shown. The steps of the flowchart 1100 may be implemented by an apparatus (e.g., vehicle, standalone battery pack in a building) described herein, and in particular, using a power stage circuit described herein. Using the flowchart 1100, the apparatus may convert a DC voltage from a battery pack to an AC voltage and provide the AC voltage to a power outlet of the apparatus.

At step 1102, a first voltage is obtained. The first voltage may include a voltage received from a battery pack. Further, the first voltage may include an AC voltage converted from a DC voltage received from the battery pack.

At step 1104, a second voltage is obtained. Similar to the first voltage, a second voltage may include a voltage received from the battery pack. Also, the second voltage may include an AC voltage converted from the DC voltage received from the battery pack.

At step 1106, the first voltage is subtracted from the second voltage in order to generate a first alternating current (AC) voltage based on the subtraction. The subtraction may be performed by a power stage circuit coupled to the first line and the second line.

At step 1108, the first voltage is added to the second voltage in order to generate a second AC voltage based on the addition. The subtraction may be performed by the power stage circuit.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
   a first line configured to receive a first voltage;
   a second line configured to receive a second voltage; and
   a power stage circuit configured to receive i) the first voltage from the first line and ii) the second voltage from the second line, the power stage circuit comprising:
   a first circuit configured to subtract the first voltage from the second voltage in order to generate a first alternating current (AC) voltage based on the subtraction, wherein the first circuit further comprises a first inductor having a first inductance value;
   a second circuit configured to add the first voltage to the second voltage in order to generate a second AC voltage based on the addition, wherein the second circuit further comprises a second inductor having a second inductance equal to the first inductance value; and a third circuit comprising a third inductor having a third inductance value less than the first inductance value.

2. The apparatus of claim 1, further comprising a third line coupled to the third circuit, wherein:
the first line and the second line are configured to provide the first AC voltage and the second AC voltage, respectively, based on a first switching frequency, and
the third line is configured to provide a third AC voltage based on a second switching frequency less than the first switching frequency.

3. The apparatus of claim 2, wherein:
the first switching frequency is based on a first set of switches, and
the second switching frequency is based on a second set of switches different from the first set of switches.

4. The apparatus of claim 1, wherein the third circuit provides a neutral with respect to the first AC voltage and the second AC voltage.

5. The apparatus of claim 1, wherein the first AC voltage is 180 degrees out of phase with respect to the second AC voltage.

6. The apparatus of claim 1, further comprising a power outlet electrically coupled to the first AC voltage and the second AC voltage.

7. The apparatus of claim 6, further comprising one or more relay matrix circuits configured to transmit power to the power outlet, wherein in a DC to AC conversion, prior to transmitting the first AC voltage and the second AC voltage to one or more relay matrix circuits, the first AC voltage and the second AC voltage are filtered by the first inductor and the second inductor, respectively.

8. The apparatus of claim 6, wherein the power stage circuit is configured to provide 120 VAC or 240 VAC to the power outlet.

9. A power stage circuit, comprising:
a first line configured to provide a first voltage based on a first switching frequency of a switch;
a second line configured to provide a second voltage based on the first switching frequency; and
a third line configured to provide a third voltage based on a second switching frequency less than the first switching frequency, wherein the third voltage is out of phase with respect to the first voltage, wherein:
the first voltage comprises a first alternating current (AC) voltage and a second AC voltage that is subtracted from the first AC voltage, and
the second voltage comprises the first AC voltage added to the second AC voltage.

10. The power stage circuit of claim 9, further comprising:
a first inductor electrically coupled to the first line, the first inductor having a first inductance value; and
a second inductor electrically coupled to the second line, the second inductor having a second inductance value equal to the first inductance value.

11. The power stage circuit of claim 10, further comprising a third inductor electrically coupled to the third line, the third inductor having a third inductance value less than the first inductance value.

12. The power stage circuit of claim 9, wherein the first AC voltage and the second AC voltage are inverted by a direct current (DC) battery electrically coupled with the first line, the second line, and the third line.

13. The power stage circuit of claim 9, wherein in response to the first AC voltage being 180 degrees out of phase with respect to the second AC voltage, the second line outputs 0 Volts.

* * * * *